US012494144B2

(12) United States Patent
Li et al.

(10) Patent No.: US 12,494,144 B2

(45) Date of Patent: Dec. 9, 2025

(54) GATE DRIVING METHOD AND CIRCUIT, AND STRECHABLE DISPLAY PANEL HAVING SAME GATE DRIVING UNIT CONTROLLING BOTH ORIGINAL PIXELS AND COMPENSATION PIXELS

(71) Applicant: HKC CORPORATION LIMITED, Shenzhen (CN)

(72) Inventors: Yao Li, Shenzen (CN); Zhonglin Cao, Shenzhen (CN); Junfeng Xie, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 18/751,232

(22) Filed: Jun. 22, 2024

(65) Prior Publication Data

US 2025/0006092 A1 Jan. 2, 2025

(30) Foreign Application Priority Data

Jun. 30, 2023 (CN) ........................ 202310801387.X

(51) Int. Cl.
*G09G 3/00* (2006.01)
*G09G 3/3225* (2016.01)

(52) U.S. Cl.
CPC ........... *G09G 3/035* (2020.08); *G09G 3/3225* (2013.01); *G09G 2320/0233* (2013.01); *G09G 2330/021* (2013.01); *G09G 2380/02* (2013.01)

(58) Field of Classification Search
CPC ................. G09G 3/035; G09G 3/3225; G09G 2320/0233; G09G 2330/021; G09G 2380/02; G09G 3/2007; G09G 3/20; G09G 3/3233; G06F 3/04164; G06F 3/0487; G06F 3/0412; H10K 59/00; H10K 59/131; H10K 77/00; H10K 50/80
See application file for complete search history.

(56) References Cited

U.S. PATENT DOCUMENTS

| | | | | |
|---|---|---|---|---|
| 2009/0224245 A1 | 9/2009 | Umezaki | | |
| 2016/0124536 A1* | 5/2016 | Hyun | G06F 3/0487 | 345/173 |
| 2016/0198567 A1* | 7/2016 | Hong | G06F 3/0412 | 362/418 |

(Continued)

FOREIGN PATENT DOCUMENTS

| | | |
|---|---|---|
| CN | 105405402 A | 3/2016 |
| CN | 108492762 A | 9/2018 |

(Continued)

*Primary Examiner* — Richard J Hong

(74) *Attorney, Agent, or Firm* — Franklin & Associates International Inc.; Matthew F. Lambrinos

(57) ABSTRACT

Disclosed are a gate driving method and circuit, and a display panel. When the display panel is deformed, a target distance between two adjacent original pixels at intervals is determined; a current state of the display panel is determined according to the target distance, and when the display panel is currently in a stretched state, the compensation pixel is controlled to compensate for light emitting display to improve brightness and/or resolution of the display panel; when the display panel is in an unstretched state, the compensation pixel is controlled not to emit light to avoid display abnormalities.

11 Claims, 7 Drawing Sheets

(56) References Cited

U.S. PATENT DOCUMENTS

| | | | | |
|---|---|---|---|---|
| 2016/0320878 | A1* | 11/2016 | Hong | G09G 3/3233 |
| 2020/0143729 | A1* | 5/2020 | Xu | G09G 3/2007 |
| 2020/0184856 | A1* | 6/2020 | Wang | H10K 77/00 |
| 2020/0193899 | A1* | 6/2020 | Li | G09G 3/20 |
| 2020/0211437 | A1* | 7/2020 | Ahn | H10K 59/00 |
| 2021/0049944 | A1* | 2/2021 | Xu | G06F 3/04164 |
| 2021/0264837 | A1* | 8/2021 | Ahn | H10K 59/131 |
| 2022/0223659 | A1* | 7/2022 | Yoon | H10K 50/80 |

FOREIGN PATENT DOCUMENTS

| | | | |
|---|---|---|---|
| CN | 109473057 | A | 3/2019 |
| CN | 116189558 | A | 5/2023 |

* cited by examiner

GATE DRIVING METHOD AND CIRCUIT, AND STRECHABLE DISPLAY PANEL HAVING SAME GATE DRIVING UNIT CONTROLLING BOTH ORIGINAL PIXELS AND COMPENSATION PIXELS

CROSS REFERENCE OF RELATED APPLICATION

The present disclosure claims the priority of Chinese patent application No. 202310801387.X filed on Jun. 30, 2023 before the China National Intellectual Property Administration of the People's Republic of China, titled "Gate driving method and circuit, and display panel", the contents of which is incorporated herein by reference in its entirety.

FIELD

The present disclosure relates to the field of display panels, in particular, to a gate driving method and circuit, and a display panel.

BACKGROUND

With the development of display industry, conventional rigid display screens are increasingly unable to meet the actual multi-scenario use requirements. As a new form of display device, flexible stretchable display screens have attracted widespread attention from consumers since variable display sizes thereof can be applied to multi-scenario practical applications. In recent years, components such as a display pixel unit, a connecting wire and a light-emitting unit are formed on a flexible substrate of organic materials to form a stretchable display device that can stretch/contract in a particular direction and change into a fixed shape as a new generation of display device. The display device can currently be used in small-size screen applications such as wearable and handheld displays, but will be more and more common to be used on large-size televisions (TV) in the future with the development of technology.

For stretchable display products, when the screen is deformed, a distance between pixels in the screen will change accordingly, and the resolution and brightness will change accordingly, resulting in worse display effects and worse watching experience of a viewer after stretching.

SUMMARY

The disclosure provides a gate driving method and circuit, and a display panel, which can solve a problem in the related art that the display effect deteriorates when the display panel is deformed.

In a first aspect, the present disclosure provides a gate driving method, which is applied to a display panel. The display panel comprises a plurality of pixel rows, and at least one of the pixel rows comprises original pixels and compensation pixels, the original pixels and the compensation pixels in the pixel row are arranged at intervals, the method comprises: determining a target distance between two adjacent original pixels if the display panel is deformed, the target distance is the distance between two adjacent original pixels after the display panel is deformed; determining a current state of the display panel based on the target distance, and controlling a switching state of the compensation pixels in the pixel row based on the current state.

In a second aspect, the present disclosure provides a gate electrode driving circuit, comprising: a plurality of gate driving units, at least one gate driving unit being respectively connected with the original pixels and the compensation pixels in a same pixel row, and the gate driving circuit drives the original pixels and the compensation pixels according to the gate driving method as described above.

In a third aspect, the present disclosure provides a display panel, which comprises a plurality of pixel rows, and at least one of the pixel rows comprises original pixels and compensation pixels, the original pixels and the compensation pixels in the pixel row are arranged at intervals, and the pixel rows are connected with the gate driving circuit as described above. The gate driving circuit is used to drive the original pixels and the compensation pixels.

According to embodiments of the present disclosure, if the display panel is deformed, a target distance between two adjacent original pixels is determined, the target distance is the distance between two adjacent original pixels after the display panel is deformed; then the current state of the display panel is determined according to the target distance, if the target distance reaches a preset value, it indicates that the display panel is currently in a stretched state, by this time the display area of the display panel increases, thus the compensation pixels are controlled to perform compensated light-emitting display, thereby improving the brightness and/or resolution of the display panel, which avoids the problem in the related technology that only the original pixels are used for light-emitting display when the display area of the display panel increases which reduces resolution and display brightness of the display panel, resulting in poor display effects; on the contrary, if the target distance does not reach the preset value, it indicates that the display panel is in an unstretched state, thus the compensation pixels are controlled not to emit light at this moment, avoiding the problem of display abnormalities and power consumption increases causing by providing compensation pixels always in light-emitting state.

BRIEF DESCRIPTION OF THE DRAWINGS

The accompanying drawings, which are incorporated in and constitute a part of this description, illustrate embodiments consistent with the disclosure and together with the description, serve to explain the principles of the disclosure.

In order to more clearly illustrate the technical solutions in the embodiments of the present disclosure or related art, the following will briefly introduce the drawings needed to describe the embodiments or related art. Obviously, for those of ordinary skill in the art, other drawings can also be obtained based on these drawings without incurring any creative effort.

REFERENCE NUMERALS

10—Display panel;
11—Pixel row;
12—Original pixel;
13—Compensation pixel;
14—First scanning line;
15—Second scanning lie;
16—Gate diving unit;
17—First thin film transistor;
18—Second thin film transistor;
20—Gate driving circuit.

DETAILED DESCRIPTION

In order to make the purpose, technical solutions and advantages of the embodiments of the present disclosure clearer, the technical solutions in the embodiments of the present disclosure will be clearly and completely described below in conjunction with the drawings in the embodiments of the present disclosure. Obviously, the described embodiments are parts of the embodiments of this disclosure, but not all of them. Based on the embodiments in this disclosure, all other embodiments obtained by those of ordinary skilled in the art without creative efforts fall within the scope of protection of this disclosure.

Embodiment 1

Figure 1:
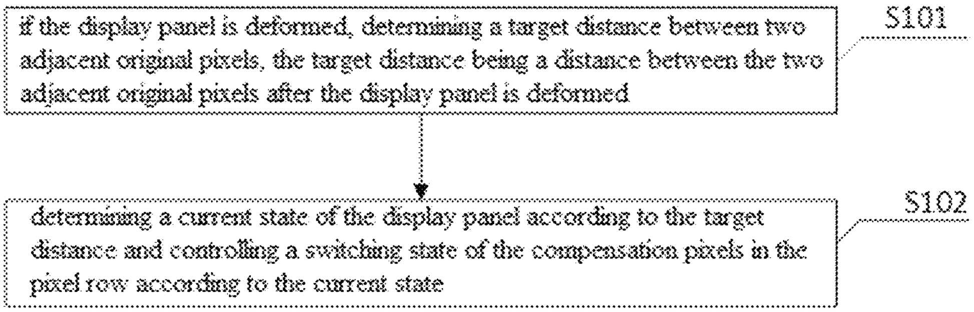
FIG. 1 is a basic flow diagram of a gate driving method of Embodiment 1 of the present disclosure.

In order to solve the problem in the related art that the display effect deteriorates when the display panel is deformed, this embodiment provides a gate driving method as shown in FIG. 1, comprising:

S101. if the display panel is deformed, determining a target distance between two adjacent original pixels, the target distance being a distance between the two adjacent original pixels after the display panel is deformed; and

S102. determining a current state of the display panel according to the target distance and controlling a switching state of the compensation pixels in the pixel row according to the current state.

Figure 2:
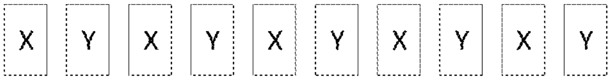
FIG. 2 is a basic structure diagram of an unstretched pixel row of Embodiment 1 of the present disclosure.

It can be understood that the gate driving method is applied to a display panel. The display panel comprises a plurality of pixel rows, at least one of the pixel rows comprises original pixels and compensation pixels, and the original pixels and the compensation pixels in the pixel row are arranged at intervals; specifically, as shown in FIG. 2, taking the original pixel of x and the compensation pixel of y as an example, the original pixels and the compensation pixels in the pixel row are arranged in the form of x, y, x, y at intervals; in some examples, the compensation pixel and the original pixel have the same display parameters, for example, when receiving the same gate drive signal, the compensation pixel and the original pixel are opened to the same degree.

It can be understood that the above-mentioned display panel comprises but is not limited to a flexible display panel. Specifically, the flexible display panel is a flexible organic light-emitting diode (OLED) panel.

In some examples, all pixel rows in the display panel are provided with compensation pixels. For example, if there are N pixel rows in the display panel, there are compensation pixels in all the N pixel rows.

In some examples, some pixel rows in the display panel are provided with compensation pixels. For example, the display panel is divided into a central area and a non-central area. The central area is an area that is focused on and used frequently by use objects. Therefore, compensation pixels provided in pixel rows of the central area can improve the display effect of the central area, while pixel rows in the non-center area are not provided with compensation pixels, which avoids the problem of increasing costs caused by the compensation pixels provided in each pixel row, thereby improving the display effect while saving production costs of the display panel.

It can be understood that the deformation of the display panel comprises but is not limited to: stretching and contracting; when the display panel is stretched, the display panel is deformed; when the display panel is contracted, the display panel is deformed; that is, if the area of a display area of the display panel changes, it is determined that the display panel is deformed.

Figure 3:
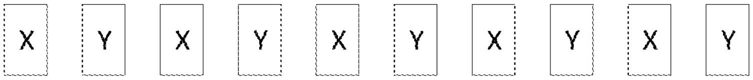
FIG. 3 is a basic structure diagram of a stretched pixel row of Embodiment 1 of the present disclosure.

It can be understood that after the display panel is stretched, the display area of the display panel increases, as shown in FIG. 3. After the display panel is stretched, a distance between the compensation pixels and the original pixels is stretched. Comparing with FIG. 2, the distance between the adjacent original pixels in FIG. 3 increases. At this time, if light-emitting display is performed only by the original pixels, resolution and display brightness of the display panel will decrease, resulting in a worse display effect; similarly, after the display panel is contracted, the display area of the display panel decreases.

In some examples, if the display panel is deformed, a target distance between the two adjacent original pixels at intervals is determined, the target distance is a distance between the two adjacent original pixels at intervals after the display panel is deformed; a current state of the display panel is determined according to the target distance, if the target distance reaches a preset value, it indicates that the display panel is currently in a stretched state, at which time the display area of the display panel increases, so that the compensation pixels are controlled to perform compensated light-emitting display, thereby improving the brightness and/or resolution of the display panel, which avoids the problem in the related art that light-emitting display is performed only by the original pixels when the display area of the display panel increases, so that the resolution and display brightness will decrease, resulting in poor display effects. Conversely, if the target distance does not reach the preset value, it indicates that the display panel is in an unstretched state, and the compensation pixels are controlled not to emit light at this time, which avoids the problem of display abnormalities and power consumption increase caused by always setting the compensation pixels to be in a light-emitting state.

In some examples of this embodiment, the original pixel corresponds to a first scanning line, the compensation pixel corresponds to a second scanning line, and the first scanning line and the second scanning line are connected to the same gate driving unit configured to provide scanning signals. It can be understood that the original pixels in the same pixel row are all connected with the first scanning line, and the compensation pixels in the same pixel row are all connected with the second scanning line. The gate driving unit provides scanning signals for the first scanning line and the second scanning line separately to control the original pixels by the first scanning line and control the compensation pixels by the second scanning line.

Following the above example, in addition, the first scanning line and the second scanning line are connected to the same gate driving unit, so that the same gate driving unit outputs scanning signals to the original pixels and compensation pixels, which avoids the problem of providing a gate driving unit for the original pixel and the compensation pixel in the pixel row separately, resulting in cost increase and an oversize frame of the display panel.

In some examples of this embodiment, the first scanning line is connected to the gate driving unit by means of a first thin film transistor, and a control end of the first thin film transistor is provided with a first sequence signal; the second scanning line is connected to the gate driving unit by means of a second thin film transistor, and a control end of the second thin film transistor is provided with a second sequence signal. Wherein, by adjusting an output time of the first sequence signal, on and off of the first thin film transistor can be controlled, thereby controlling the time when the original pixel receives the scanning signal transmitted by the gate driving unit; by adjusting an output time of the second sequence signal, on and off of the second thin film transistor can be controlled, thereby controlling the time when the original pixel receives the scanning signal transmitted by the gate driving unit.

Following the above example, for example, taking the first thin film transistor and the second thin film transistor as the same type of thin film transistor, output times of the first sequence signal and the second sequence signal are set to be the same, the first thin film transistor and the second thin film transistor are turned on and off simultaneously, so that the original pixel and the compensation pixel are turned on and off simultaneously; for another example, output time of the gate driving unit is 1 H, after output time of the first sequence signal set to M (M is less than 1 H), output of the second sequence signal is controlled, so that the compensation pixel will not be turned on until turning on time of the original pixel reaches M. For another example, in some cases, when the gate driving unit is output, output of the second sequence signal is stopped, so that the compensation pixel remains off.

It can be understood that in some examples, the first scanning line and the second scanning line are connected to different gate driving units, that is, corresponding gate driving units are separately provided for the original pixel and the compensation pixel, so as to realize control of the original pixel and the compensation pixel.

In some examples of this embodiment, the current state comprises a stretched state; controlling the switching state of the compensation pixels in the pixel row according to the current state comprises: simultaneously providing a scanning signal for the original pixels and the compensation pixels, so as to simultaneously turn on the original pixels and the compensation pixels. Specifically, by simultaneously providing the scanning signal for the original pixels and the compensation pixels, the original pixels and the compensation pixels are simultaneously turned on and off.

Following the above example, it can be understood that when the display panel is in a stretched state, the display area of the display panel increases. If light-emitting display is performed only by the original pixels, the original pixels cannot perfectly cover the increased display area, resulting in decrease of resolution and display brightness of the display panel, causing the display effect of the display panel to deteriorate. Therefore, at this time, the compensation pixels in the same pixel row emit light to cover the increased display area in the display panel, thereby increasing the resolution and/or display brightness of the display panel.

It can be understood that in some examples, if the compensation pixels display the same content as the corresponding original pixels after the display screen is stretched, the brightness of the display panel is increased by the compensation pixels, thus avoiding the problem that the original pixels cannot perfectly cover the increased display area after the display panel is stretched, which in turn causes the display brightness of the display panel to decrease and the display effect of the display panel to deteriorate. Specifically, for example, there are N original pixels and N Compensation pixels in one pixel row, and the original pixels and the compensation pixels are arranged at interval in sequence. Each compensation pixel corresponds to the previous original pixel, and the compensation pixel displays the same content as the previous original pixel after the display is stretched, at which time each compensation pixel and compensation pixel together cover the original display area and the increased display area of the display panel, thereby improving the brightness of the display panel by means of the compensation pixels.

In some examples, if the compensation pixels display different content from the corresponding original pixels after the display screen is stretched, the brightness and resolution of the display panel are improved by the compensating pixels, thus avoiding the problem that after the display panel is stretched, the original pixels cannot perfectly cover the increased display area, which in turn causes the display brightness of the display panel to decrease and the display effect of the display panel to deteriorate. Specifically, for example, there are N original pixels and N compensation pixels in one pixel row, and the original pixels and the compensation pixels are arranged at intervals in sequence, and each compensation pixel corresponds to the previous original pixel. The compensation pixel displays different content from the previous original pixel after the display screen is stretched, at which time the display panel changes from the original resolution corresponding to N columns to resolution corresponding to 2N columns, thereby improving the brightness and resolution of the display area of the display panel.

In some examples of this embodiment, the current state comprises a stretched state; controlling the switching state of the compensation pixel in the pixel row according to the current state comprises: providing a scanning signal for the original pixel to turn on the original pixel; when turning on duration of the original pixel reaches a first threshold, providing a scanning signal to the compensation pixel to turn on the compensation pixel; when turning on duration of the original pixel reaches a second threshold, providing the scanning signal for the compensation pixel is stopped. Wherein, when the first scanning line and the second scanning line are connected to the same gate driving unit and the same gate driving unit outputs the scanning signals of the original pixel and the compensation pixel, in order to avoid the gate driving unit outputting the scanning signal to the original pixel and the compensation pixel simultaneously, a level of the scanning signal received by the original pixel becomes low, resulting in incomplete turning on of the original pixel and deteriorating display effect. In this example, first the scanning signal is provided for the original pixel while the scanning signal is not provided to the compensation pixel, so that the level of the scanning signal received by the original pixel is normal, ensuring that the original pixel is fully turned on, and when turning on duration of the original pixel reaches the first threshold, the scanning signal is provided for the compensation pixel to turn on the compensation pixel, so that the compensation pixel compensates for light emission.

Following the above example, for example, the original pixel corresponds to the first scanning line, and the compensation pixel corresponds to the second scanning line. The first scanning line and the second scanning line are connected to the same gate driving unit, the first scanning line is connected to the gate driving unit by a first thin film transistor, and a control end of the first thin film transistor is provided with a first sequence signal; when the second scanning line is connected to the gate driving unit by a second thin film transistor, and a control end of the second thin film transistor is provided with a second sequence signal, the output time of the gate driving unit is 1 H, output of the first sequence signal is controlled while the second sequence signal is not output. At this time, the first thin film transistor is turned on, while the second thin film transistor is not turned on. The original pixel receives the scanning signal alone, and the original pixel is fully turned on. After the output time of the first sequence signal reaches M (M is less than 1 H), output of the second sequence signal is controlled, so that the second thin film transistor is turned on, and both the original pixel and the compensation pixel receive the scanning signal. Finally, after the output time 1 H of the gate driving unit ends, the first sequence signal and the second sequence signal are controlled to stop output simultaneously, and both the first thin film transistor and the second thin film transistor are not turned on to avoid error light emission.

In some examples of this embodiment, the current state comprises an unstretched state; controlling the switching state of the compensation pixels in the pixel row according to the current state comprises: providing a scanning signal for the original pixel to turn on the original pixel; stopping providing the scanning signal for the original pixel to turn off the compensation pixel. Wherein when the current state is an unstretched state, the display area of the display panel is not increased, while there is no need for the compensate pixels to compensate for light emission, and light is emitted by the original pixels.

Following the above example, for example, the original pixel corresponds to the first scanning line, and the compensation pixel corresponds to the second scanning line. The first scanning line and the second scanning line are connected to the same gate driving unit, the first scanning line is connected to the gate driving unit by a first thin film transistor, and a control end of the first thin film transistor is provided with the first sequence signal; the second scanning line is connected to the gate driving unit by a second thin film transistor, and when the control end of the second thin film transistor is provided with the second sequence signal, the output time of the gate driving unit is 1 H, output of the first sequence signal is controlled, and the second sequence signal remains not being output. At this time, the first thin film transistor is turned on and the second thin film transistor is not turned on, the original pixel receives the scanning signal alone, and the original pixel is completely turned on. After 1 H, output of the first sequence signal is controlled to stop, and both the first thin film transistor and the second thin film transistor are not turned on to avoid error light emission.

In some examples of this embodiment, the display panel comprises a plurality of display areas. If the display panel is deformed, determining a target distance between two adjacent original pixels at intervals comprises: if the display panel is deformed, determining the deformed display area in the display panel; determining the target distance between the two adjacent original pixels at intervals in the deformed display area. Wherein, the display panel can be divided into a plurality of display areas, and status of each display area can be different. For example, the display panel is divided into three areas: area A, area B and area C from left to right. If area A is deformed, the target distance between the two adjacent original pixels at intervals in area A is determined, and a target state of area A is determined based on the target distance, with which the compensation pixels in area A are controlled.

In some examples of this embodiment, at least one of the pixel rows has a corresponding compensation pixel row which is provided between two of the pixel rows. After the current state of the display panel is determined according to the target distance, the method further comprises: controlling the switching state of the compensation pixel row in the pixel row according to the current state.

Specifically, the compensation pixel row is provided between two pixel rows. When the display panel is not stretched, the pixel row is controlled to emit light and the compensation pixel row is controlled not to emit light, when the display panel is stretched, the display area of the display panel becomes larger, the pixel row and the compensation pixel row are controlled to emit light together, thereby improving the resolution and/or brightness of the display panel.

In the gate driving method provided in this embodiment, the target distance between the two adjacent original pixels at intervals is determined when the display panel is deformed, and the current state of the display panel is determined based on the target distance. If the target distance reaches the preset value, it indicates that the display panel is currently in a stretched state, at which time the display area of the display panel becomes larger, and the compensation pixels are controlled to compensate for the light emitting display, thereby improving the brightness and/or resolution of the display panel, avoiding the problem in the related art that when the display area of the display panel becomes larger, light emitting display is performed only through the original pixels, and the resolution and display brightness of the display panel will decrease, resulting in a deteriorating display effect. Conversely, if the target distance does not reach the preset value, it indicates that the display panel is in an unstretched state, at which time the compensation pixels are controlled not to emit light, thus avoiding display abnormalities and power consumption increase caused by always setting the compensation pixels to be in a light-emitting state.

Embodiment 2

In order to better understand the disclosure, this example provides a more specific example for illustration.

Figure 4:
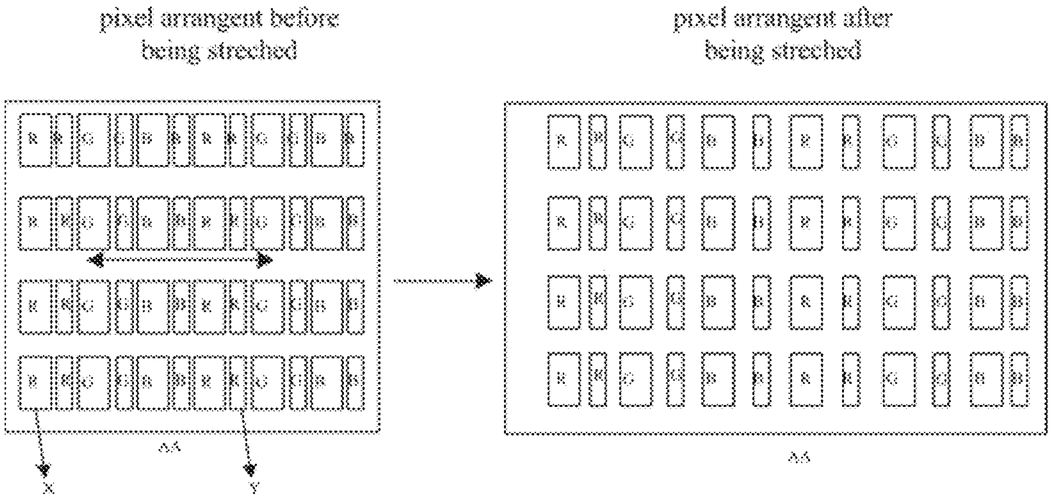
FIG. 4 is a basic structure diagram of a display panel provided with compensation pixels of Embodiment 2 of the present disclosure.

This example proposes a gate driving method in which a compensation pixel y is added between original pixels x of a display panel. As shown in FIG. 4, the compensation pixel y is located at a stretchable position in a display area. Due to stretchability of the current material, the compensation pixel y will be stretched when the screen is stretched, while an area where the original pixel x is located is designed into an "island" structure and will not be stretched accordingly, which aims to ensure characteristics of a thin film transistor (TFT) of the original pixel x to ensure the display effect. However, display of the compensation pixel y is only compensation display. It can be seen from this that this design can increase the compensation pixels when the screen is stretched, thereby compensating for the display resolution in the stretched state of the screen.

Wherein, GOA is the abbreviation of Gate Driven on Array, which means gate driven integration on an array substrate and can realize a row-by-row scanning drive function of a liquid crystal panel. In a traditional active matrix liquid crystal display, a row scanning signal is realized by an external integrated circuit (G-COF/IC). GOA driving means that using the same process as that of the thin film transistor to produce a row scanning drive circuit in a case where the external circuit provides only several control signals, to achieve the row-by-row scanning drive function. Therefore, the GOA driving saves integrated circuits related to the scanning drive and reduces the production costs of the liquid crystal display.

Figure 5:
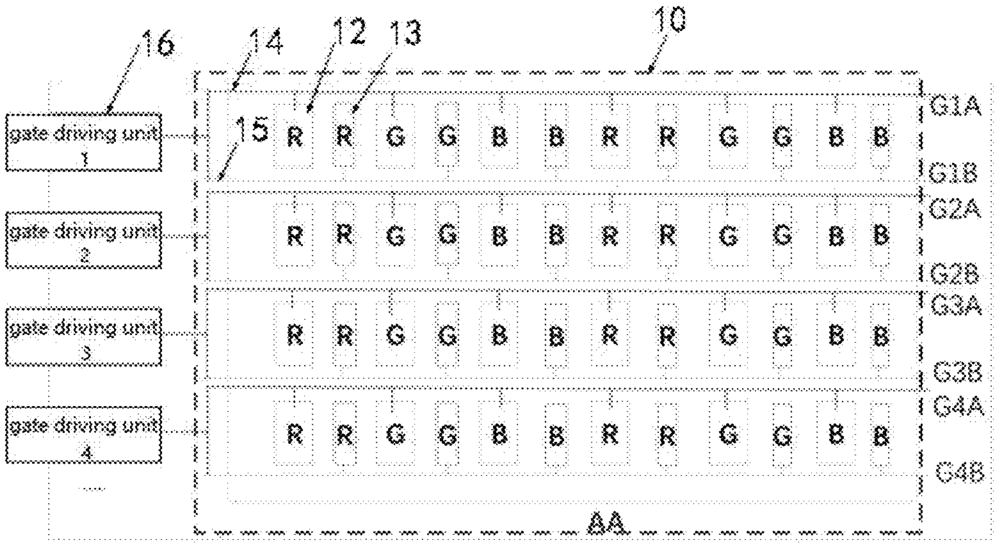
FIG. 5 is a basic structure diagram of connection of an original pixel and a compensation pixel with the gate driving unit of Embodiment 2 of the present disclosure.

Specifically, as shown in FIG. 5, whether the display panel 10 is stretched or not, at least one pixel row comprises normal pixels 12 and compensation pixels 13. In each row, a first scanning line 14 corresponding to the normal pixel 12 is connected to a GA signal, and a second scanning line 15 corresponding to the compensation pixel 13 is connected to a GB signal. That is, each row of pixels has two rows of scanning lines connected to the same gate driving unit 16. The GA and GB signals need to be provided respectively for the two rows of scanning lines during display.

Following the above example, if a conventional single row of scanning lines corresponds to a row of GOA output, the compensation pixels also require a row of normal GOA model output. For a stretchable screen, providing a corresponding gate driving unit for each row of scanning lines will lead to cost increase and a frame being too large, therefore, this solution also proposes a new GOA driving method. A single row of GOA outputs GA and GB signals, and compensation of the resolution can be achieved by changing the gate turning on sequence of GA signal and GB signal.

Figure 6:
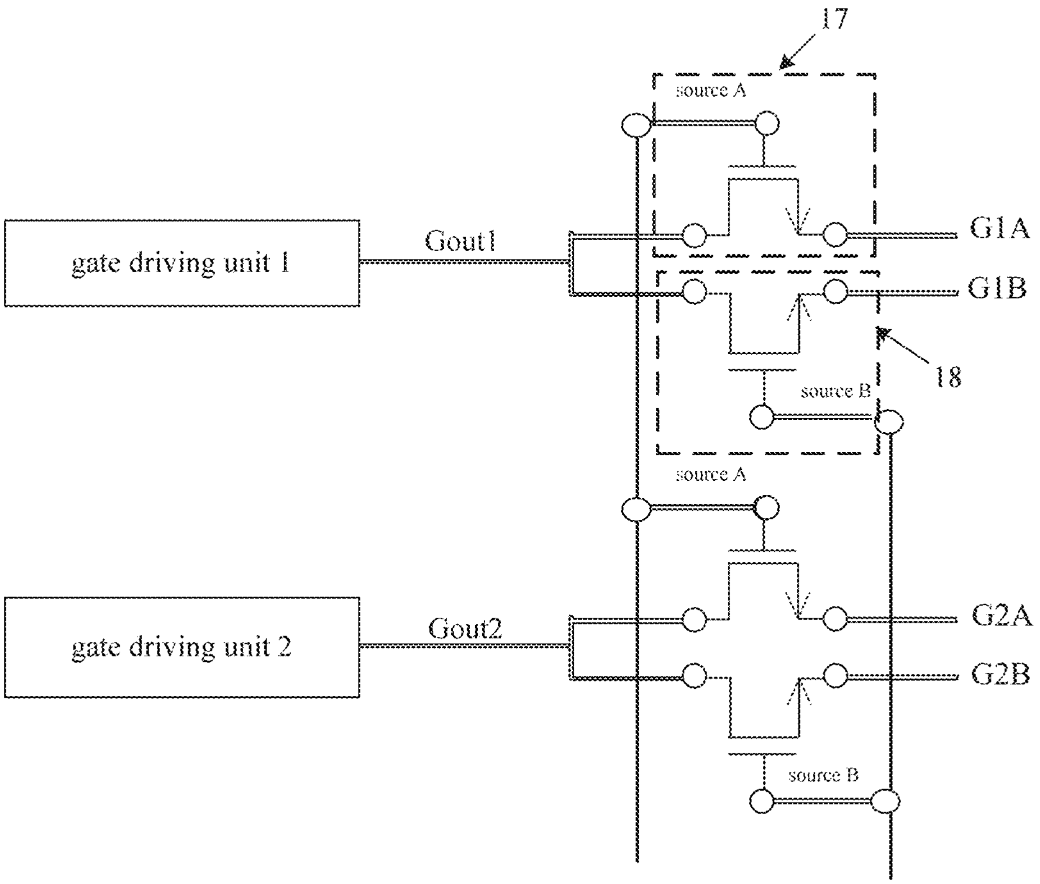
FIG. 6 is a basic structure diagram of a gate driving unit connected with a scanning line by means of a thin film transistor of Embodiment 2 of the present disclosure.

Specifically, taking a 6CK GOA driving architecture as an example, without changing the original 6CK GOA driving architecture, referring to FIG. 6, FIG. 6 shows a basic schematic diagram of output of two gate driving units in the 6CK GOA driving architecture. Two TFT devices are added after an output Gout1 signal of a gate driving unit 1, that is, a first thin film transistor 17 and a second thin film transistor 18. A source (drain) of one end of a single device is connected to the output of G1A, and a drain (source) of the other end is connected to the input of Gate 1, and a gate of the device is connected to an information source A. A source (drain) of one end of the other device is connected to the output of Gout 1, and a drain (source) of the other end is connected to the input of G1B. A gate of the device is connected to an information source B, and output Gout2 of gate driving unit 2 is also connected to two TFT devices, which output the signals of G2A/G2B respectively. Connection types of GOA in the following N rows are the same, in which all the information sources A are connected with each other, and all the information sources B are connected with each other.

Figure 7:
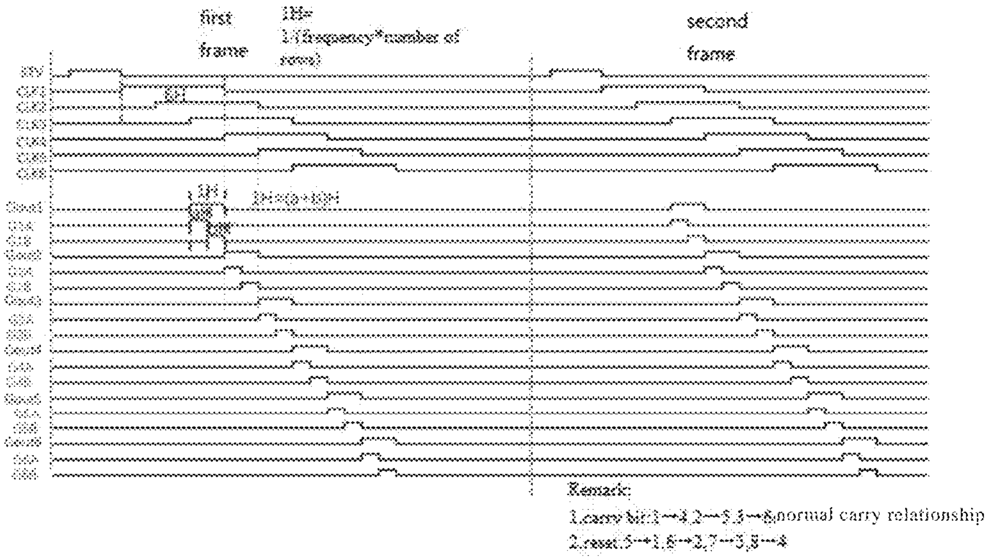
FIG. 7 is a basic sequence diagram of each signal in a gate driving unit of Embodiment 2 of the present disclosure.

Following the above example, as shown in FIG. 7, FIG. 7 shows a basic sequence diagram of each signal in the gate driving unit. In the sequence diagram of FIG. 7, turning on time of the single CLK is 3 H, output time of the Gout is 1 H, and 1 H=1/(frequency*number of rows). According to the different turning on sequences of GA signal and GB signal, there can be the following two solutions.

Figure 8:
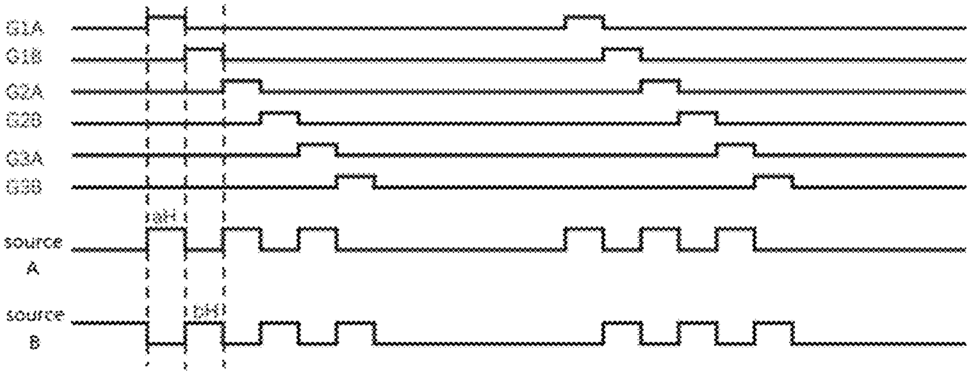
FIG. 8 is a basic sequence diagram of each signal in another gate driving unit of Embodiment 2 of the present disclosure.

Solution 1: As shown in FIG. 8, turning on times of GA signal and GB signal do not overlap, that is, GA signal is turned on for time of a H first, and then GB signal turns on after GA signal is turned off. Due to the different screen stretch states, charging time b H can be adjusted according to a charging demand when the compensation pixel is in a stretched state, as long as (a+b) H=1 H.

According to—a time relationship between the above GA signal and GB signal that need to be turned on, the corresponding turning on sequence of the information sources A and B is as shown in FIG. 8. The A/B information source signals are reverse to each other, and the reverse frequency is 1 H. The turning on and reversal time of the A/B information source need to correspond to the turning on time a H and b H of GA signal and GB signal. At this time, normal pixels and compensation pixels are turned on row by row, so different images can be displayed. This solution will not cause a Gout signal shunt phenomenon, but the charging time of normal pixels decrease after stretching, so it is necessary to ensure that there is sufficient margin for the charging time during design.

Figure 9:
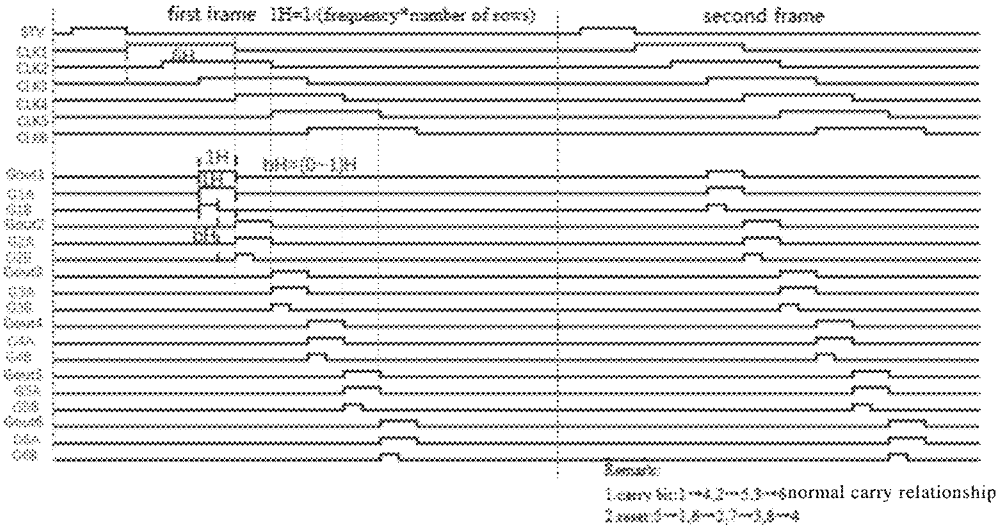
FIG. 9 is a basic sequence diagram of each signal in still another gate driving unit of Embodiment 2 of the present disclosure.

Solution 2: As shown in FIG. 9, turning on times of GA signal and GB signal overlap, that is, during the output time of Gout, GA signal is always turned on, and turning on time of GB signal is b H. Due to the different screen stretch states, charging time b H can be adjusted according to the charging demand when compensation pixels are in the stretched state, b H=(0~1) H, wherein turning on of GB signal can start with GA signal or start later and end at the same time with GA signal, as long as the charging time is ensured, the turning on time is not limited.

Figure 10:
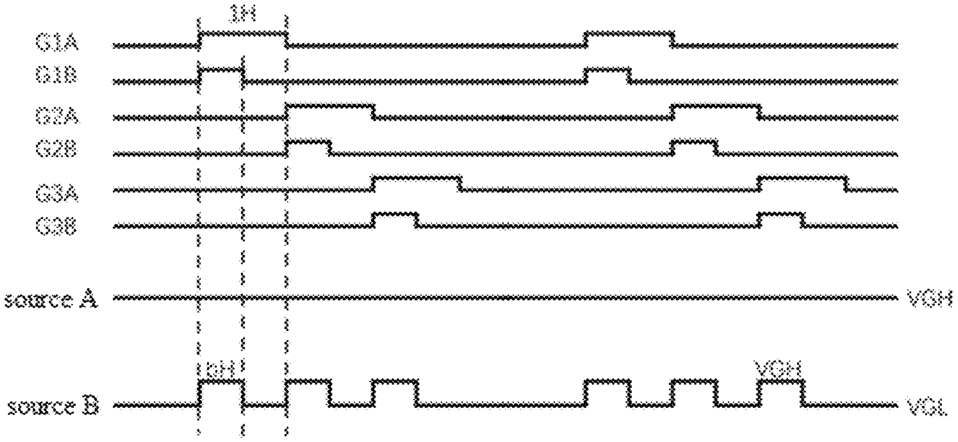
FIG. 10 is a basic sequence diagram of each signal in yet another gate driving unit of Embodiment 2 of the present disclosure.

According to a—time relationship between the above GA signal and GB signal that need to be turned on, the corresponding turning on sequence of information sources A and B is as shown in FIG. 10. The A information source signal is always in a VGH turning on state, and the information source B needs to be reversed, and the reverse frequency is 1 H. The turning on and reversal time of the information source B needs to correspond to the turning on time b H of GB signal. At this time, the normal pixels and the compensation pixels are turned on together, so the same image is displayed. This solution will cause a Gout signal shunt phenomenon, so an attenuation degree of the Gout signal needs to be considered during design to ensure the characteristic design margin of the device.

It can be understood that this example is described using 6CK as an example. A GOA model applicable to the gate driving method proposed in this example is not limited to 6 CK, and is applicable to GOA models with any CK number, which is not limited here.

It can be understood that as there may be situations where stretching degrees are different at different positions when the display panel is stretched, an actual stretching position can be divided into several parts according to the display panel. Assuming the actual stretching position is divided into 3 parts, each part can be designed as circuit connection in the proposal, which requires 3 groups of information sources A1A2A3/B1B2B3. Each group of positions will have a stretched state and unstretched state. The three groups of positions are controlled independently and do not affect each other. The turning on sequence and time of the information source B1/B2/B3 can be identified and set respectively According to the stretching degree of each part, which can realize independent control display by part of the stretched state of the display panel.

By designing compensation pixels and shunting the output Gout signal of a single row of GOA to normal pixels and compensation pixels, and by changing the turning on sequence and turning on time of the compensation pixels, this example can adapt to display needs of different stretching degrees and compensate for the display resolution.

Embodiment 3

Figure 11:
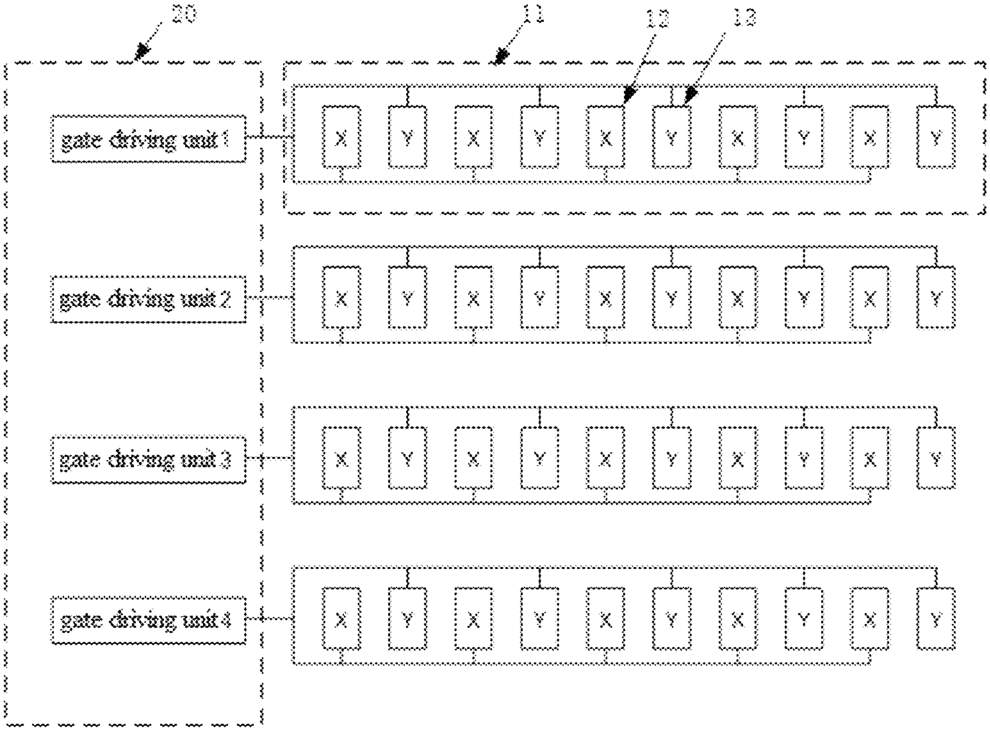
FIG. 11 is a basic structure diagram of a gate driving circuit of Embodiment 3 of the present disclosure.

Based on the same concept, this embodiment provides a gate driving circuit, as shown in FIG. 11. The gate driving circuit 20 comprises: a plurality of gate driving units 16, wherein at least one of the gate driving units 16 is connected to an original pixel 12 and a compensation pixel 13 in the same pixel row 11, and the gate driving circuit 20 drives the original pixel 12 and the compensation pixel 13 according to the gate driving method as described above.

Wherein, the gate driving circuit 20 provided in this embodiment can perform the above gate driving method, wherein the method comprises:

- if the display panel 10 is deformed, determining a target distance between two adjacent original pixels 12, the target distance being a distance between the two adjacent original pixels 12 after the display panel 10 is deformed; and
- determining a current state of the display panel 10 according to the target distance and controlling a switching state of the compensation pixel 13 in the pixel row 11 according to the current state.

In some examples, the current state comprises a stretched state; controlling a switching state of the compensation pixel 13 in the pixel row 11 according to the current state comprises: providing a scanning signal to the original pixel 12 and the compensation pixel 13 simultaneously to turn on the original pixel 12 and the compensation pixel 13 simultaneously.

In some examples, the current state comprises a stretched state; controlling the switching state of the compensation pixel 13 in the pixel row 11 according to the current state comprises: providing a scanning signal for the original pixel 12 to turn on the original pixel 12; when a turning on time of the original pixel 12 reaches a first threshold, providing a scanning signal for the compensation pixel 13 to turn on the compensation pixel 13; when the turning on time of the original pixel 12 reaches a second threshold, stopping providing the scanning signal for the compensation pixel 13.

In some examples, the current state comprises an unstretched state; controlling the switching state of the compensation pixel 13 in the pixel row 11 according to the current state comprises: providing a scanning signal for the original pixel 12 to turn on the original pixel 12; and stopping providing scanning signal for the original pixel 12 to turn off the compensation pixel 13.

In some examples, the original pixel 12 corresponds to a first scanning line 14, the compensation pixel 13 corresponds to a second scanning line 15, the first scanning line 14 and the second scanning line 15 are connected to the same gate driving unit 16, and the gate driving unit 16 is configured to provide a scanning signal.

In some examples, the first scanning line 14 is connected to the gate driving unit 16 through a first thin film transistor 17, and a control end of the first thin film transistor 17 is provided with a first sequence signal; the second scanning line 15 is connected to the gate driving unit 16 through a second thin film transistor 18, and a control end of the second thin film transistor 18 is provided with a second sequence signal.

In some examples, the display panel 10 comprises a plurality of display areas, and if the display panel 10 is deformed, determining a target distance between two adjacent original pixel s 12 at intervals if the display panel 10 deforms comprises: determining a deformed display area in the display panel 10 if the display panel is deformed; and determining a target distance between two adjacent original pixel s 12 at intervals in the deformed display area.

In some examples, at least one of the pixel rows 11 is provided with a corresponding compensation pixel row, and the compensation pixel row is provided between two of the pixel rows 11. After determining the current state of the display panel 10 according to the target distance, the method further comprises: controlling a switching state of the compensation pixel row in the pixel row 11 according to the current state.

Embodiment 4

Figure 12:
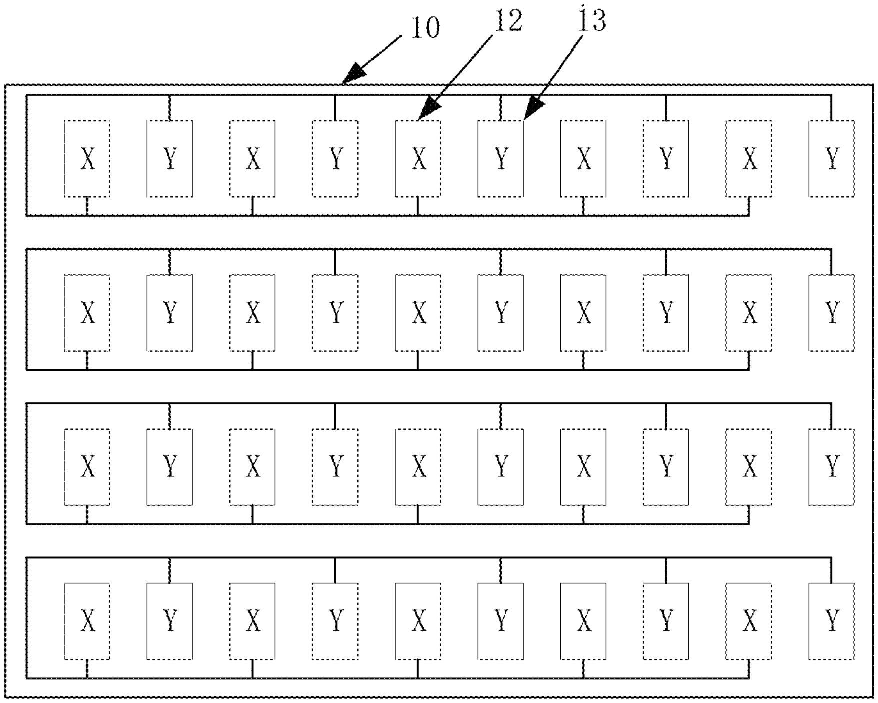
FIG. 12 is a basic structure diagram of a display panel of Embodiment 4 of the present disclosure.

Based on the same concept, this embodiment further provides a display panel 10. As shown in FIG. 12, the display panel 10 comprises a plurality of pixel rows 11, and at least one of the pixel rows comprises an original pixel 12 and a compensation pixel 13. The original pixel 12 and the compensation pixel 13 in the pixel row 11 are arranged at intervals, and the pixel row 11 is connected to the gate driving circuit 20 as described above. The gate driving circuit 20 is configured to drive the original pixel 12 and the compensation pixel 13, and the gate driving circuit 20 is configured to drive the pixel row 11 according to the gate driving method as described in any of the above embodiments.

In some examples, at least one pixel row 11 is connected to the gate driving circuit 20 as described above.

It can be understood that the display panel 10 comprises but is not limited to a flexible display panel 10. Specifically, the flexible display panel is a flexible OLED panel 10.

It should be noted that herein, relational terms such as "first" and "second" are only used to distinguish one entity or operation from another entity or operation, and do not necessarily require or imply these There is no such actual relationship or sequence between entities or operations. Furthermore, the terms "comprise" "comprising" or any other variations thereof are intended to cover a non-exclusive inclusion such that a process, method, article, or apparatus that comprises a list of elements comprises not only those elements, but also those not expressly listed other elements, or elements inherent to the process, method, article or equipment. Without further limitation, an element defined by the statement "comprises a . . . " does not exclude the presence of additional identical elements in a process, method, article, or apparatus that comprises the stated element.

The above description are only specific embodiments of the present disclosure, enabling those skilled in the art to understand or implement the present disclosure. Various modifications to these embodiments will be readily apparent to those skilled in the art, and the generic principles defined herein may be practiced in other embodiments without departing from the spirit or scope of the disclosure. Thus, the present disclosure is not intended to be limited to the embodiments shown herein but is to be accorded the widest scope consistent with the principles and novel features claimed herein.

What is claimed is:

1. A gate driving method applied to a display panel, wherein the display panel comprises a plurality of pixel rows, and at least one of the pixel rows comprises an original pixel and a compensation pixel arranged at intervals, the method comprising:

if the display panel is deformed, determining a target distance between two adjacent original pixels at intervals, the target distance being a distance between the two adjacent original pixels at intervals after the display panel is deformed; and determining a current state of the display panel according to the target distance and controlling a switching state of the compensation pixel in the pixel row according to the current state;

wherein the current state comprises a stretched state; wherein controlling the switching state of the compensation pixel in the pixel row according to the current state comprises:

providing a scanning signal for the original pixel to turn on the original pixel;

when turning on time of the original pixel reaches a first threshold, providing a scanning signal for the compensation pixel to turn on the compensation pixel;

when turning on time of the original pixel reaches a second threshold, stop providing the scanning signal for the compensation pixel.

2. The gate driving method according to claim 1, wherein the current state comprises a stretched state; controlling the switching state of the compensation pixel in the pixel row according to the current state comprises:

providing a scanning signal to the original pixel and the compensation pixel simultaneously to turn on the original pixel and the compensation pixel simultaneously.

3. The gate driving method according to claim 1, wherein the current state comprises an unstretched state; controlling the switching state of the compensation pixel in the pixel row according to the current state comprises:

providing a scanning signal for the original pixel to turn on the original pixel;

stop providing the scanning signal for the compensation pixel to turn off the compensation pixel.

4. The gate driving method according to claim 1, wherein the original pixel corresponds to a first scanning line, the compensation pixel corresponds to a second scanning line, and the first scanning line and the second scanning line are connected to a same gate driving unit configured to provide the scanning signal.

5. The gate driving method according to claim 4, wherein the first scanning line is connected to the gate driving unit through a first thin film transistor, and a control end of the first thin film transistor is provided with a first sequence signal;

the second scanning line is connected to the gate driving unit through a second thin film transistor, and a control end of the second thin film transistor is provided with a second sequence signal.

6. The gate driving method according to claim 1, wherein the display panel comprises a plurality of display areas, and when the display panel is deformed, determining the target distance between the two adjacent original pixels at intervals comprises:

when the display panel is deformed, determining a display area in the display panel where deformation occurs;

determining the target distance between the two adjacent original pixels at intervals in the deformed display area.

7. The gate driving method according to claim 1, wherein at least one of the pixel rows has a corresponding compensation pixel row disposed between two of the pixel rows, and after determining the current state of the display panel according to the target distance, the method further comprises:

controlling the switching state of the compensation pixel in the pixel row according to the current state.

8. The gate driving method according to claim 1, wherein the compensation pixel and the original pixel have a same display parameter.

9. The gate driving method according to claim 1, wherein the original pixel corresponds to a first scanning line, the compensation pixel corresponds to a second scanning line, the first scanning line and the second scanning line are connected to different gate driving units configured to respectively provide a scanning signal for the first scanning line and the second scanning line.

10. A gate driving circuit, comprising:

a plurality of gate driving units, at least one of which is connected to an original pixel and a compensation pixel in a same pixel row separately, the gate driving circuit is configured to determine a target distance between two adjacent original pixels at intervals if a display panel is deformed, the target distance being a distance between the two adjacent original pixels at intervals after the display panel is deformed, and determine a current state of the display panel according to the target distance and control a switching state of the compensation pixel in the pixel row according to the current state; and wherein the original pixel corresponds to a first scanning line, the compensation pixel corresponds to a second scanning line, and the first scanning line and the second scanning line are connected to a same gate driving unit configured to provide a scanning signal.

11. A display panel comprising a plurality of pixel rows, at least one of which comprises an original pixel and a compensation pixel arranged at intervals, and the pixel rows are connected to a gate driving circuit configured to drive the original pixel and the compensation pixel, wherein the gate driving circuit comprises a plurality of gate driving units, at least one of which is connected to the original pixel and the compensation pixel in a same pixel row separately.

* * * * *